United States Patent

[11] 3,616,272

[72] Inventors: Alfred Goerg, Bloney/Vaud; Michel Chevalley, Bex/Vaud, both of Switzerland
[21] Appl. No. 676,299
[22] Filed Oct. 18, 1967
[45] Patented Oct. 26, 1971
[73] Assignee Ciba Limited, Basel, Switzerland
[32] Priority Oct. 21, 1966
[33] Switzerland
[31] 15319/66

[54] APPARATUS FOR MAKING CONTINUOUS MEASUREMENTS IN LIQUID MEDIA
4 Claims, 1 Drawing Fig.
[52] U.S. Cl. ........................................ 204/1 T, 73/349, 324/30, 204/195
[51] Int. Cl. ........................................ G01n 27/46
[50] Field of Search ........................................ 204/1.1, 195, 195.1, 237–239; 324/308, 61 LP; 73/194, 202, 203, 349

[56] References Cited
UNITED STATES PATENTS
| | | | |
|---|---|---|---|
| 2,046,467 | 7/1936 | Krause | 204/149 |
| 2,230,593 | 2/1941 | Hassler | 204/195 |
| 2,700,897 | 2/1955 | Arps | 204/195 |
| 3,131,133 | 4/1964 | Barendrecht | 204/1.1 |

Primary Examiner—T. Tung
Attorneys—Harry Goldsmith, Joseph G. Kolodny and Bryant W. Brennan ABSTRACT: The invention relates to apparatus for making continuous measurements in liquid media slowly traveling upwardly, which tend to form deposits, in which apparatus a branch line contains at least one measuring sensor and a pump located before the measuring point in the flow direction and is connected with the apparatus through which the medium to be measured flows in a manner such that its induction end is attached at the point where the measurement is to be taken and its pressure end below this point and the measuring point located in between each point of the branch line being inclined to the horizontal.

PATENTED OCT 26 1971 3,616,272
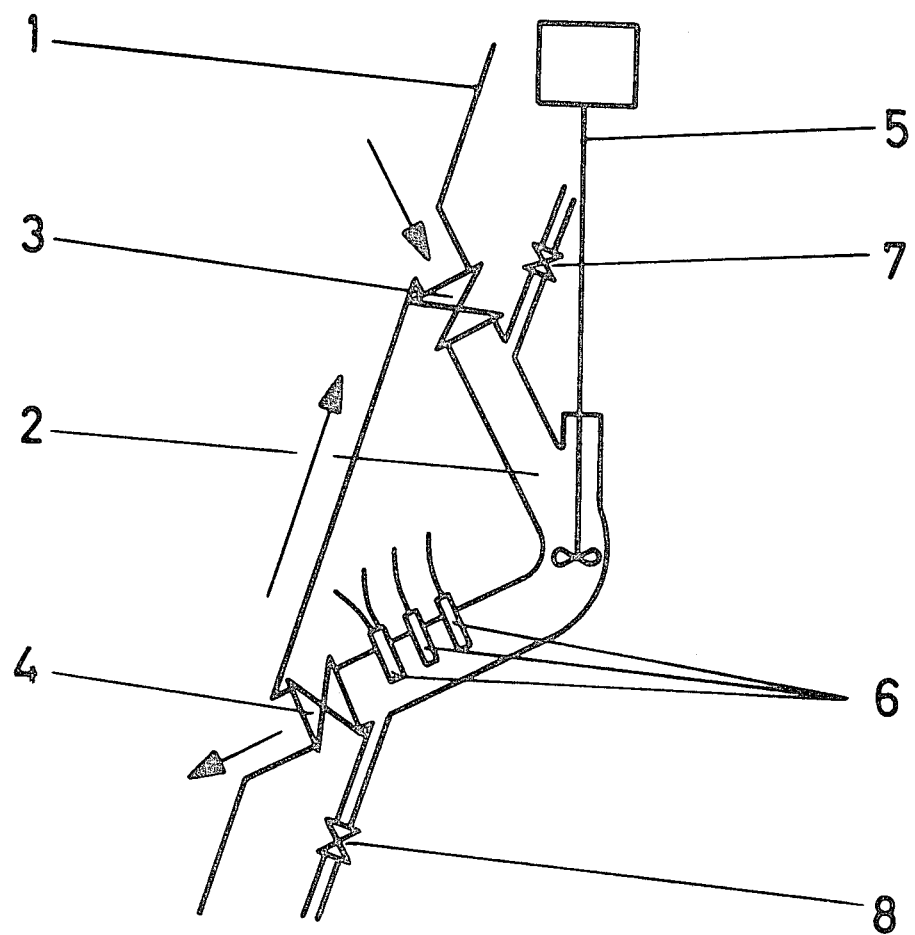

APPARATUS FOR MAKING CONTINUOUS MEASUREMENTS IN LIQUID MEDIA

The present invention relates to an apparatus for carrying out continuous measurements in liquid media tending to form deposits or crusts, which travel slowly in an upward direction, especially such media in which solids are suspended. The apparatus is suitable for measuring a variety of characteristic data that can be measured by means of sensors, for example temperatures, pressures, and especially values that are measured with electrode, for example redox potentials, or above all pH values. A branch line of the apparatus (bypass) contains at least one measuring sensor and a pump located before the measuring position in the flow direction and is connected with the apparatus through which the medium to be measured flows in a manner such that its induction end is at the point where measurement is to be taken and its pressure end is below this point and the measuring point located in between. The branch line is at every point inclined from the horizontal, that is to say it is so designed that there is no appreciable throughflow of the downwards travelling liquid in the horizontal or ascending direction at any one of its points.

Therefore, at the point where the measurement is to be taken part of the medium is continuously sucked out of the main stream and at the speed, which—owing to the action of the pump—is greater than that of the main stream, it is returned via at least one measuring sensor to the main stream farther down.

The measuring apparatus is quite generally suitable for all liquid media of the indicated kind, especially for media in which chemical reaction produce precipitates which would deposit on the walls of the vessels and on measuring sensors. In most cases the formation of a solid coating on the measuring sensor causes a deviation of the measured values from the actual values so that the purpose of the measuring operation, the continuous checking of the progress of the reaction, is rendered difficult or perhaps even impossible. The formation of a deposit on the wall of the vessel can as a rule be prevented by suitable expedients, for example the provision of so-called scouring stirrers. However, when the reactor comprises measuring sensors let in through its walls, suitable recesses must be provided on the stirrer, but it is just these recessed measuring sensors on which deposits cannot be prevented. To remove a deposit from the measuring sensor, or to replace such a sensor, it is therefore necessary to empty the reactor up to at least the height of the measuring sensor. Such interruptions in the operation are, of course, very undesirably, especially when reaction media are concerned whose composition undergoes changes inside the reactor. The periodic or continuous taking of samples from such reactors likewise causes difficulties such as clogging of the withdrawal duct, formation of deposits on the measuring sensor by the taking of a sample and considerably losses of material by repeated sample taking. It is principally possible to clean the measuring sensors inside the apparatus, for example by means of ultrasound, but such a method is often not wholly satisfactory and always complicated and expensive. These disadvantages can be overcome by the new measuring apparatus.

It is advantageous to provide between the induction end, through which part of the substance to be measured is branched off from the mean stream, and the pressured end, through which this branch current is returned to the main stream, a not-too-long path, for example so that the whole branching is just sufficiently long to accommodate the requisite components. As mentioned above, the branch line must be inclined from the horizontal at each point, advantageously so that it forms along all its length an angle of at least 20° with the horizontal. In any case it is necessary to provide on the branch line before, that is to say above, the measuring point, a feed pump, preferably an axial flow pump. Especially with substances that have a great tendency to form crusts, or have a substantial content of solid, it is moreover advantageous to locate the pump close to the measuring sensors so that the latter are situated within the range of the pump's immediate effect. This arrangement enables an undesired coating to be prevented; in some cases the solid particles travelling through the branch line may even exert a certain scouring action so that the measuring sensors remain free from deposits at all times.

If necessary, a heating or cooling device, for example in the form of a jacket or pipe coil, may be provided on the branch line. Quite generally, however, it is recommended to provide a stopcock both at the suction end and at the pressure end; these cocks enable the whole measuring installation to be disconnected, if desired, without interrupting the production run. If this is done, the measuring sensors are easy to replace and when a supply and discharge line with a cock each are provided, the whole branch line can be flushed with a suitable cleansing liquid. If required or desired, the pump or even the whole installation between the two stop cocks can be temporarily removed or exchanges. The speed of flow in the branch line must, above all, at the location of the measuring sensor by greater than that of the main stream. It should be borne in mind that an increase in the cross-sectional area of the pipe, for example in the region of the measuring sensors, is associated with a lower speed and what in cases where such a slowdown cannot be prevented for whatever reason the output of the pump selected should be adequately high.

The present apparatus has proved particularly suitable for measuring the pH value in cleaning brine by the addition of lime, the lime being continuously stirred into the hot, flowing brine at such a rate that the brine finally has a pH value of at least 10, part of the precipitated sludge in the reaction zone being kept in contact with the brine and the flow rate being adjusted so that the brine does not carry along any sludge, the brine being purified by being transported upwardly in a conically flaring vessel whose bottom portion forms the sedimenting vessel in which a pipe, which reaches from above to below the liquid level, is inserted for introduction of the lime and which is connected approximately along the border between the reaction zone and the sedimenting chamber with a device for discharging the sedimented sludge, and at least one feed device for the brine. The apparatus of the invention comprises advantageously:

A. A tubular branch line having a diameter of at least 3 cm., through which a certain portion of the reaction mixture can be branched off at the point where the pH value is to be measured and returned to the reaction vessel below this point, the branch line being designed so that with the liquid flowing downwardly there is nowhere an appreciable throughflow in the horizontal or ascending direction, B. a feed pump which transports the liquid downwardly in the branch line at a speed greater than that of the main stream, and C. measuring electrodes let into the branch line. The pH value is measured with this apparatus in the following manner:

A' A certain portion of the reaction mixture is withdrawn from the reaction vessel at the point where the pH value is to be measured through the branch line according to A. and then returned to the reaction vessel;

B' by means of a feed pump the liquid in the branch line is moved downwardly so rapidly that no sediment can form in it, at a temperature in the branch line not much different from that at the withdrawal point at the reaction vessel, and C' the pH value is measured by means of the electrodes let into the branch line.

Devices and processes of the indicated kind for purifying brines are known, especially also those in which, likewise underneath the level of the liquid but above the point at which lime is fed in, an alkali metal carbonate is introduced to precipitate the calcium ions (cf. French Pat. No. 1,259,630 and German Pat. No. 1,209,562).

The drawing is a diagrammatic representation of a variant of the apparatus of this invention which is particularly suited to the continuous measuring of pH values in the above-mentioned process for purifying brine. The symbols have the following meanings:

1 – wall of the reaction vessel
2 – branch line
3 – stopcock at the induction end
4 – stopcock at the pressure end
5 – axial flow pump
6 – measuring electrodes (connected with pH registering apparatus)
7 – flushing liquid supply pipe with stopcock
8 – flushing liquid discharge pipe with stopcock If desired, a warning signal, for example, of the accoustic kind, can be provided on the apparatus of the invention to indicate that certain measured values are being exceeded or are not reached. The measuring apparatus may also be used as a direct check of the feed rate of reactants, for example lime in the aforementioned purification of brine.

EXAMPLE

A reactor (1) having a total volume of 17 cu. m. including the sedimenting chamber, such as is used for purifying crude brine by the processes of the patent specifications mentioned above, in which by lime fed in magnesium ions are removed and at a point which is higher than the lime feed point, calcium ions are removed by sodium carbonate fed in, is fitted laterally with a measuring apparatus as shown in the drawing. The internal diameter of the branch tube (2) is 70 mm., the distance between its two ends being 640 mm. The measuring electrodes (6) are connected with a pH measuring instrument which is placed at a certain distance away from the apparatus to protect it from dirt. The axial flow pump (5) is so designed and adjusted that its throughput is about 2 cu.m. per hour (speed: about 15 cm. per second). The induction end is attached where the pH value should be 9. When the pH measuring instrument, which is advantageously of the recording type, indicates a deviation of ±0.5 unit, the lime supply is correspondingly regulated.

It was possible to operate such an apparatus without trouble and without interruption for 6 months and, compared with periodic checks (one check per hour, by taking samples and measuring the pH value with reagent paper), it produced a saving of 300 to 500 g. of lime per cu.m. of brine.

On the other hand, electrodes working in the same medium but without a new apparatus, had developed a coating after a few hours and gave false values.

We claim:

1. A method for making continuous measurements in a liquid medium slowly travelling upwardly through a reaction vessel, which medium tends to form deposits, which comprises withdrawing a portion of the medium from the reaction vessel directing the withdrawn medium in a downward direction in a branch line through a pump and then past at least one measuring sensor returning the withdrawn medium to the reaction vessel and taking the desired measurement on said medium with said measuring sensor said branch line being inclined to the horizontal at each point.

2. The method according to claim 1, wherein the angle of inclination at each point of the branch line is at least 20° with the horizontal.

3. The method according to claim 1, wherein the pump is an axial flow pump, and the measuring sensors are located immediately within the sphere of action of the pump.

4. The method according to claim 1, wherein said measuring sensors comprise electrodes.

* * * * *